(12) United States Patent
Peng et al.

(10) Patent No.: US 8,446,153 B2
(45) Date of Patent: May 21, 2013

(54) ADAPTOR FAILURE TOLERANCE TEST DEVICE

(75) Inventors: Zheng-Quan Peng, Shenzhen (CN); Guan Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 261 days.

(21) Appl. No.: 13/086,344

(22) Filed: Apr. 13, 2011

(65) Prior Publication Data
US 2012/0187955 A1  Jul. 26, 2012

(30) Foreign Application Priority Data
Jan. 21, 2011  (CN) .......................... 2011 1 0023825

(51) Int. Cl.
*G01R 31/02* (2006.01)

(52) U.S. Cl.
USPC ........................ 324/537; 324/500; 324/750.01

(58) Field of Classification Search
None
See application file for complete search history.

(56) References Cited

U.S. PATENT DOCUMENTS
8,064,179 B2 * 11/2011 Apfel ............................. 361/90
8,194,646 B2 *  6/2012 Elliott et al. .................. 370/352

* cited by examiner

*Primary Examiner* — Melissa Koval
*Assistant Examiner* — Trung Nguyen
(74) *Attorney, Agent, or Firm* — Altis Law Group, Inc.

(57) ABSTRACT

An adaptor failure tolerance test device includes a first connection module, a second connection module, a teaming control module, and a connection control module. The first connection module includes eight first interfaces configured for connecting to a plurality of respective adaptors of a network server. The second connection module includes eight second interfaces configured for connecting to a switch. The teaming control module includes eight first switches, each of which is connected to a corresponding first interface. The connection control module includes eight second switches and a control unit. Each of the second switches is interposed between a corresponding first switch and a corresponding second interface. The control unit is configured for detecting which first switches are turned on and turning on the second switches corresponding to the first switches which are turned on for a predetermined time period.

8 Claims, 2 Drawing Sheets

ADAPTOR FAILURE TOLERANCE TEST DEVICE

BACKGROUND

1. Technical Field

The present disclosure relates to adaptor failure tolerance (AFT) technology and, particularly, to an AFT test device capable of efficiently testing whether or not adaptors of a server are available for AFT.

2. Description of Related Art

Currently, a network server typically has more than one adaptor. The adaptors can be grouped. This is known as adaptors teaming technology. The adaptors in the same team often have a primary adaptor and a secondary adaptor. In normal operation, the secondary adaptor is disabled. If the link to the primary adaptor fails, the link to the secondary adaptor automatically takes over. This is known as (AFT) technology. To make sure the adaptors in the network server are available for AFT, a test is generally carried out before the network server leaves the factory. The test mainly includes the following steps: enabling every adaptor in the team under test for a predetermined time period in turn to simulate that every adaptor in the team under test functions as the primary adaptor in the corresponding predetermined time period in turn, and recording the performances of every adaptor to evaluate AFT availability of the adaptor of the network server. However, current testing is carried out mainly by manual operations. For example, every adaptor in the team under test is typically enabled and disabled by manually connecting the adaptor to and disconnecting the adaptor form network, which is inefficient.

Therefore, it is desirable to provide an AFT test device, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
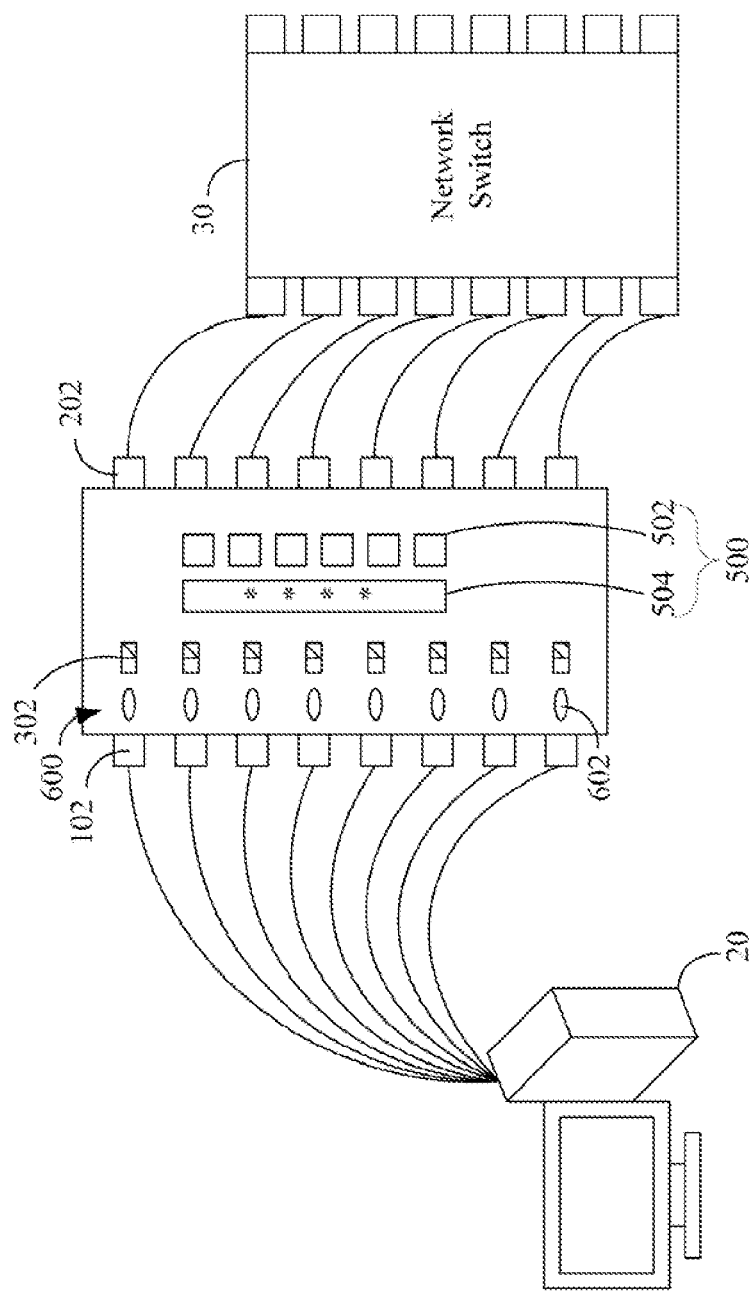
FIG. 1 is a schematic view of an AFT test device, according to an embodiment.
Figure 2:
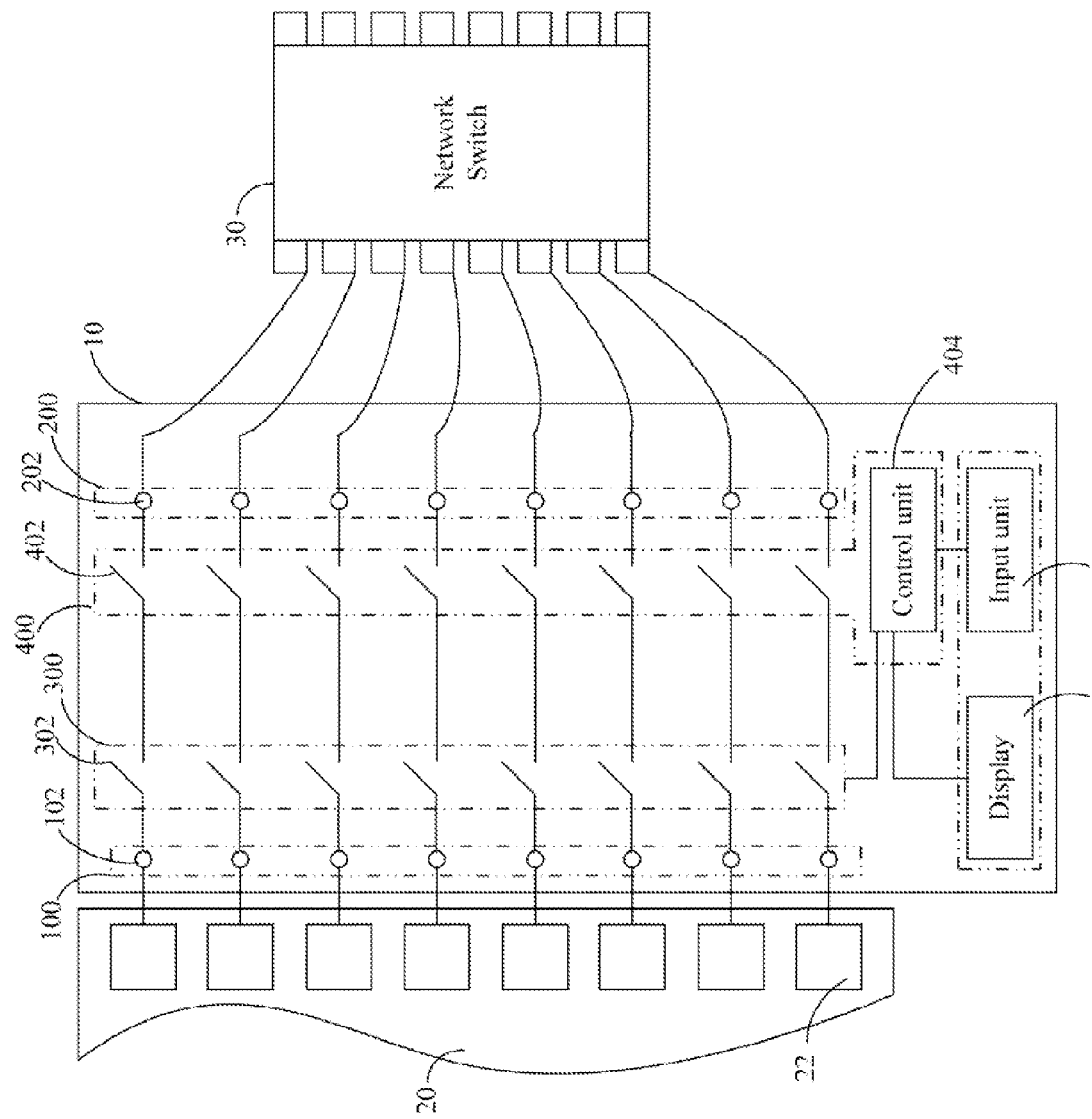
FIG. 2 is a circuit diagram of the AFT test device of FIG. 1.

Referring to FIGS. 1 and 2, an AFT test device 10, according to an embodiment, includes a first connection module 100, a second connection module 200, a teaming control module 300, and a connection control module 400.

The first connection module 100 includes a number of first interfaces 102 configured for connecting to a number of respective adaptors 22 of a network server 20. In this embodiment, the first connection module 100 includes eight first interfaces 102. The first interfaces 102 can be RJ-45 connectors.

The second connection module 200 includes a number of second interfaces 202 configured for connecting to a network switch 30. In this embodiment, the second connection module 200 includes eight second interfaces 202. The second interfaces 202 can be RJ-45 connectors too.

The teaming control module 300 is configured for teaming the adaptors 22 depending on test requirements and thus determining a team of the adaptors 22 to be tested. In this embodiment, the teaming control module 300 includes eight first switches 302, each of which is interposed between a corresponding first interface 102 and a corresponding second interface 202. When a first switch 302 is put on, the corresponding adaptor 22 can be connected to network through the corresponding second interface 202 and the network switch 30 and thus is grouped with the team to be tested. When a first switch 302 is put off, the corresponding adaptor 22 cannot be connected to the network any more and thus is eliminated from the team to be tested. In this embodiment, all the first switches 302 are put on. That is, all the adaptors 22 are grouped into the team to be tested. The first switches 302 are slide switches and can be manually operated to determine the team to be tested before an AFT test is carried out. In addition, the first switches 302 can be integrated into a programmable switch, which can be programmed to automatically put on or off the first switches 302 based upon input parameters during the AFT test is carried out.

The connection control module 400 is configured for connecting every adaptor 22 in the team under test to the network through the corresponding first interface 102, the second interface 202, and the network switch 30 for a predetermined time period in turn. In this embodiment, the connection control module 400 includes a number of second switches 402 and a control unit 404. In this embodiment, the number of the second switches 402 is eight. Each of the second switches 402 is interposed between the corresponding first switch 302 and the corresponding second interface 202. When a second switch 402 is put on, the corresponding adaptor 22 in the team under test is connected to the network and functions as a primary adaptor. When a second switch 402 is put off, the corresponding adaptor 22 in the team under test is disconnected from the network and behaves as a secondary adaptor. The control unit 404 is configured for detecting which first switches 102 are on and puts on the second switches 402 corresponding to the first switches 302, which are on for a predetermined time period in turn.

The AFT test device 10 can further include a user interface 500. The user interface 500 includes an input unit 502, such as a keypad, and a display 504. The input unit 502 is configured for receiving the input parameters, such as the predetermined time period. The display 504 is configured for displaying the input parameters and other additional information. For example, if no first switch 302 or less than two first switches 302 are detected on, the control unit 404 can signal the display 504 to display information indicative of error teaming, such as "teaming error".

The AFT test device 10 can further include an indication module 600. The indication module 600 includes a number of indicators 602, such as, a light emitting diode. Each indicator 602 is configured for indicating a connection between the corresponding first interface 102 and the corresponding second interface 202. For example, each indicator 60 can flick when the corresponding first interface 102 and the corresponding second interface 202 are connected and is turned off when the corresponding second interfaced 202 is disconnected from the corresponding second interface 202.

It will be understood that the above particular embodiments are shown and described by way of illustration only. The principles and the features of the present disclosure may be employed in various and numerous embodiment of the present disclosure without departing from the scope of the disclosure as claimed. The above-described embodiments illustrate the scope of the disclosure but do not restrict the scope of the disclosure.

What is claimed is:

1. An adaptor failure tolerance test device, comprising:
   a first connection module comprising a plurality of first interfaces configured for connecting to a plurality of respective adaptors of a network server;
   a second connection module comprising a plurality of second interfaces configured for connecting to a switch;
   a teaming control module comprising a plurality of first switches, each of which is connected to a corresponding first interface; and
   a connection control module comprising a plurality of second switches and a control unit, each of the second switches being interposed between a corresponding first switch and a corresponding second interface, the control unit being connected to the teaming control module and configured for detecting which first switches are turned on and turning on the second switches, corresponding to the first switches which are turned on, for a predetermined time period in turn.

2. The adaptor failure tolerance test device of claim 1, wherein each first interface comprises an RJ-45 connector.

3. The adaptor failure tolerance test device of claim 1, wherein each second interface comprises an RJ-45 connector.

4. The adaptor failure tolerance test device of claim 1, wherein each first switch comprises a slide switch.

5. The adaptor failure tolerance test device of claim 1, further comprising a user interface, the user interface comprising an input unit and a display, the input unit being connected to the control unit and configured for receiving input parameters and transmitting the input parameters to the control unit, the display being configured for displaying the input parameters, the control unit turning on the second switches based on the input parameters.

6. The adaptor failure tolerance test device of claim 5, wherein the input parameters comprise the predetermined time period.

7. The adaptor failure tolerance test device of claim 5, wherein the control unit is configured for signaling the display to display information indicative of error teaming if no first switch is detected to be turned on or less than two first switches are detected to be turned on.

8. The adaptor failure tolerance test device of claim 1, further comprising an indication module, the indication module comprising a plurality of indicator, each of which is configured for indicating a connection between a corresponding first interface and a corresponding second interface.

* * * * *